United States Patent
Converse et al.

(10) Patent No.: US 8,835,067 B2
(45) Date of Patent: Sep. 16, 2014

(54) SATURATED VAPOR BLOCK FOR FROZEN FUEL CELL POWER PLANT

(75) Inventors: David G. Converse, Hampden, MA (US); Fortunat J. Mueller, North Yarmouth, ME (US)

(73) Assignee: Ballard Power Systems Inc., Burnaby (CA)

( * ) Notice: Subject to any disclaimer, the term of this patent is extended or adjusted under 35 U.S.C. 154(b) by 485 days.

(21) Appl. No.: 13/059,658

(22) PCT Filed: Sep. 25, 2008

(86) PCT No.: PCT/US2008/077595
§ 371 (c)(1),
(2), (4) Date: Feb. 18, 2011

(87) PCT Pub. No.: WO2010/036253
PCT Pub. Date: Apr. 1, 2010

(65) Prior Publication Data
US 2011/0143246 A1    Jun. 16, 2011

(51) Int. Cl.
*H01M 8/04* (2006.01)
*F28D 21/00* (2006.01)

(52) U.S. Cl.
CPC ... *H01M 8/04007* (2013.01); *F28D 2021/0042* (2013.01); *H01M 8/04253* (2013.01); *H01M 8/04738* (2013.01); *H01M 8/04753* (2013.01); *H01M 8/04373* (2013.01); *Y02B 90/14* (2013.01); *Y02E 60/50* (2013.01); *H01M 2250/10* (2013.01); *H01M 8/04223* (2013.01); *H01M 8/04074* (2013.01)
USPC .......... 429/429; 429/427; 429/428; 429/433; 429/434; 429/435; 429/437; 429/440; 429/442; 429/443

(58) Field of Classification Search
CPC ................. H01M 2250/10; H01M 8/04007; H01M 8/04074; H01M 8/04253; H01M 8/04753; H01M 8/04738; H01M 8/04223; H01M 8/04373; Y02B 90/14; Y02E 60/50; F23D 2021/0041
USPC ................. 429/427–429, 422–425, 437–440, 429/442–443, 433, 434, 435
See application file for complete search history.

(56) References Cited

U.S. PATENT DOCUMENTS

| | | |
|---|---|---|
| 6,797,421 B2 | 9/2004 | Assarabowski et al. |
| 6,824,906 B2 | 11/2004 | Wattelet et al. |

(Continued)

OTHER PUBLICATIONS

International Preliminary Report on Patentability for International application No. PCT/US2008/077595 mailed Sep. 25, 2008.

(Continued)

*Primary Examiner* — Patrick Ryan
*Assistant Examiner* — Ben Lewis
(74) *Attorney, Agent, or Firm* — Seed IP Law Group PLLC

(57) ABSTRACT

A fuel cell power plant includes a cell stack assembly having an anode and a cathode. A component is arranged in fluid connection with at least one of the anode and cathode. The component has a first shut-down cooling rate. A heat exchanger is arranged in fluid communication with and between the component and one of the anode and cathode. The heat exchanger has a second shut-down cooling rate greater than the first shut-down cooling rate. Water vapor within the fuel cell power plant outside of the cell stack assembly will condense and freeze in the heat exchanger rather than the component, avoiding malfunction of the component upon start-up in below freezing environments.

16 Claims, 1 Drawing Sheet

(56) References Cited

U.S. PATENT DOCUMENTS

| | | |
|---|---|---|
| 6,986,959 B2 | 1/2006 | Clark et al. |
| 2002/0119352 A1* | 8/2002 | Baldauf et al. ................. 429/13 |
| 2006/0280993 A1* | 12/2006 | Keefer et al. ................... 429/34 |
| 2007/0196706 A1* | 8/2007 | Sasaki et al. .................... 429/22 |
| 2007/0287037 A1* | 12/2007 | Limbeck ......................... 429/13 |
| 2008/0299429 A1* | 12/2008 | Desrosiers et al. ............. 429/26 |
| 2009/0260788 A1* | 10/2009 | Nitta et al. .................... 165/175 |
| 2010/0028734 A1* | 2/2010 | Ballantine et al. ............. 429/17 |

OTHER PUBLICATIONS

International Search Report for PCT Application No. PCT/US2008/077595, Dec. 4, 2008.

* cited by examiner

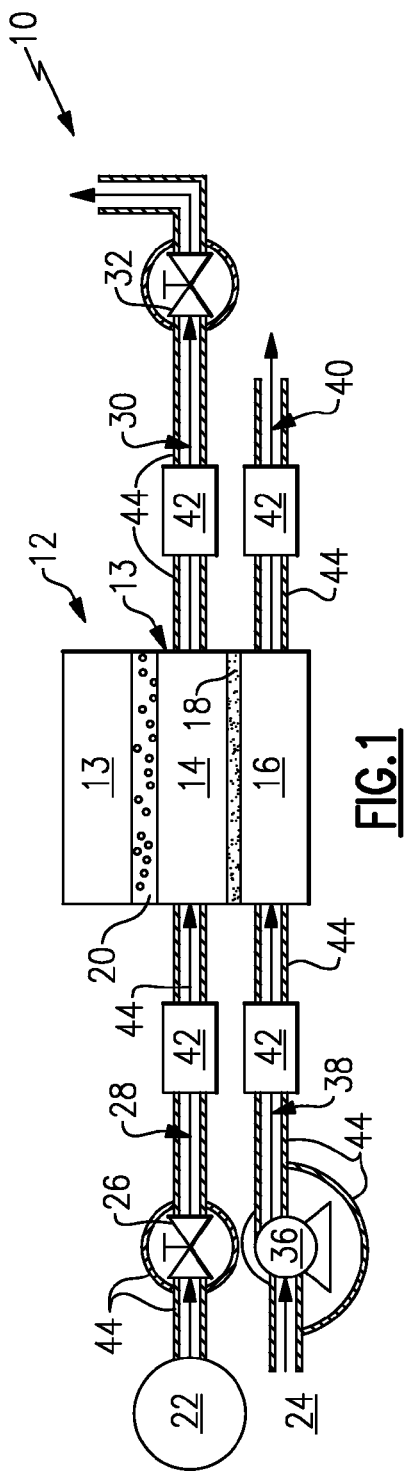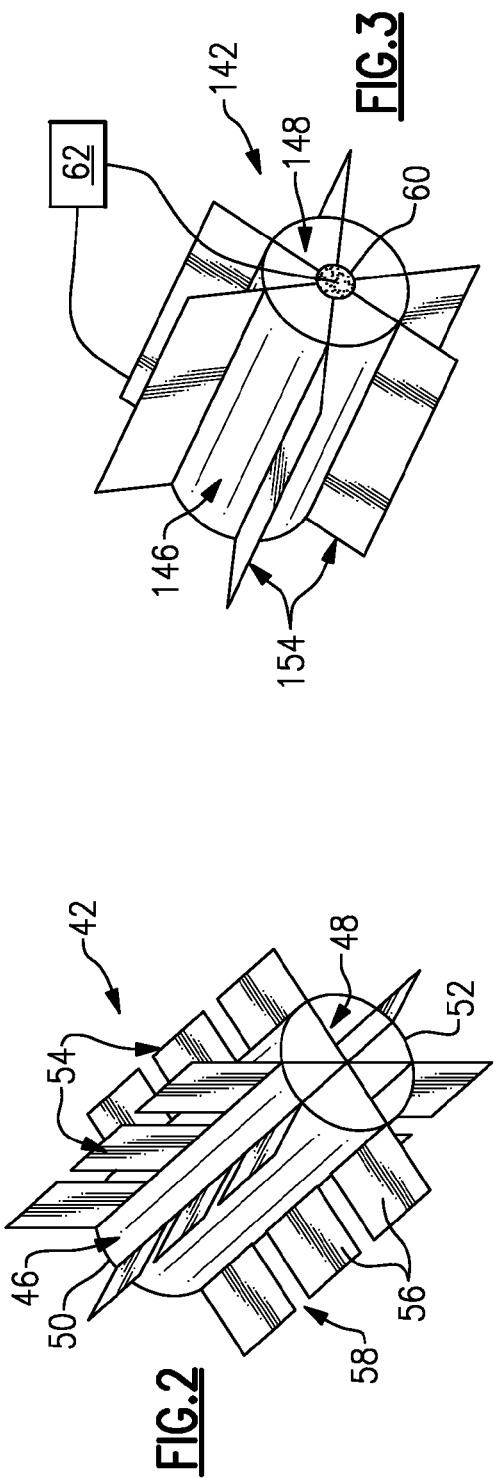

SATURATED VAPOR BLOCK FOR FROZEN FUEL CELL POWER PLANT

BACKGROUND

This disclosure relates to a fuel cell power plant, and more particularly, the disclosure relates to an arrangement that is useful during a fuel cell shut-down.

A fuel cell power plant includes a cell stack assembly that generates electricity in response to a chemical reaction. A fuel and a reactant, such as hydrogen and air, are respectively supplied to an anode and a cathode of the cell stack assembly.

A hydrogen-fuel cell stack assembly will have saturated water vapor in its reactant inlet and outlet lines after the power plant has been shut-down. The water vapor is in the air and is also produced in the chemical reaction in the cell stack assembly. If the power plant cools down in an ambient environment that has a temperature below freezing, then the reactant lines and components attached to those lines may act as a heat sink to the cell stack assembly. If these components cool faster than the cell stack assembly, then saturated vapor, originating in the cell stack assembly, will diffuse and condense on the attached components and lines and freeze. This freezing can cause items to malfunction on a subsequent start-up because any moveable elements may have become stuck.

What is needed is an arrangement that prevents components from malfunctioning after a shut-down procedure due to condensing water vapor.

SUMMARY

A fuel cell power plant is disclosed that includes a cell stack assembly having an anode and a cathode. A component is arranged in fluid connection with at least one of the anode and cathode. The component has a first shut-down cooling rate. A heat exchanger is arranged in fluid communication with and between the component and one of the anode and cathode. The heat exchanger has a second shut-down cooling rate greater than the first shut-down cooling rate. Water vapor within the fuel cell power plant outside of the cell stack assembly will condense and freeze in the heat exchanger rather than the component, avoiding malfunction of the component upon start-up in below freezing environments.

These and other features of the disclosure can be best understood from the following specification and drawings, the following of which is a brief description.

BRIEF DESCRIPTION OF THE DRAWINGS

FIG. 1 is a highly schematic view of an example fuel cell power plant according to one example of this disclosure.

FIG. 2 is an example heat exchanger for use with the fuel cell power plant shown in FIG. 1.

FIG. 3 is another example heat exchanger for use in the fuel cell power plant shown in FIG. 1.

DETAILED DESCRIPTION

An example fuel cell power plant 10 is schematically illustrated in FIG. 1. It should be understood that the fuel cell power plant 10 shown in FIG. 1 is highly schematic and for exemplary purposes only. That is, the arrangement illustrated in FIG. 1 should not be construed as limiting and may be varied within the scope of the claims.

The fuel cell power plant 10 includes a cell stack assembly 12 having multiple cells 13. Each cell 13 includes an anode 14 and a cathode 16 separated by a proton exchange membrane 18, for example. Each cell 13 may include a coolant and/or water flow field 20.

A fuel source 22 and a reactant source 24 are respectively fluidly connected to the anode 14 and the cathode 16 for supplying a fuel and reactant. In one example, the fuel is hydrogen, and the reactant is air. The fuel source 22 supplies hydrogen to the anode 14 through an inlet line 28. A valve 26 regulates the flow of hydrogen into the anode 14 in response to a command from a controller (shown schematically at 62 in FIG. 3). Unused hydrogen exits the anode 14 through an outlet line 30. In one example, a valve 32 controls the flow of unused hydrogen from the cell stack assembly 12.

In the example shown in FIG. 1, the reactant source 24 is provided by an outside environment from which air is pumped to the cathode 16 by a blower 36 through an inlet line 38. Air exits the cathode 16 through an outlet line 40. Connections from one or more controllers to the valves 26, 32 and blower 36 are omitted for clarity.

The fuel cell power plant 10 includes components having moveable elements, such as the valves 26, 32 and blower 36. The components may malfunction if water becomes frozen within the components. Water is produced as a result of the chemical reaction within the cells 13. Water vapor from the chemical reaction, in addition to any water vapor from the fuel source 22 and reactant source 24 may be contained within the lines 28, 30, 38, 40 and components outside of the cell stack assembly 12 (valves 26, 32 and blower 36). The lines and components can act as a heat sink to the cell stack assembly 12 subsequent to a shut-down procedure, resulting in the water vapor condensing and freezing (in a freezing environment), which can cause the fuel cell power plant 10 to malfunction.

One or more heat exchangers 42 are arranged within the fuel cell power plant 10 to control the location at which water vapor condenses and freezes. In the example shown, a heat exchanger 42 is provided on each of the lines 28, 30, 38, 40 in fluid communication with and between the cell stack assembly 12 and an adjoining component. The heat exchanger 42 provides a more rapid cooling rate than a cooling rate of the component for which it is desirable to avoid water condensation and freezing. That is, the rate of temperature drop for the heat exchanger 42 is greater than that of the component. In one example, the heat exchanger 42 is arranged in as close proximity to the cell stack assembly 12 as is practical. Heat exchanger 42 is located where it can cool faster than the components in order to trap the water vapor in the heat exchanger 42.

Insulation 44 may be provided around the lines 28, 30, 38, 40 and/or the valves 26, 32 and blower 36 to further ensure that the heat exchanger 42 has a greater cooling rate than that of the components for which it is desirable to avoid water condensation and freezing.

Example heat exchangers 42, 142 are respectively shown in FIGS. 2 and 3. The heat exchanger 42 illustrated in FIG. 2 includes a body 46 providing a passageway 48 that permits the flow of gas (fuel or reactant) through the heat exchanger 42. The body 46 provides an inlet 50 and outlet 52. Fins 54 extend outwardly from the body 46 to increase the cooling rate of the heat exchanger 42. In one example, the fins 54 extend inwardly to a common location within the passageway 48. Gaps 58 in the fins 54 provide segments 56, which enhance airflow around the fins 54, further increasing the cooling rate of the heat exchanger 42.

The heat exchanger 142 shown in FIG. 3 includes a body 146 having unbroken fins 154. The fins 154 extend into the passageway 148 to a centrally located heating element 60, for example. The heating element 60 is in communication with a controller 62. If water vapor collecting within the heat exchanger 142 becomes frozen thereby obstructing the passageway 48, the controller 62 sends a signal to the heating element 60 to heat the passageway 148. The heating element 60 thaws the frozen water during start-up to again enable gas to flow through the passageway 148.

Although example embodiments have been disclosed, a worker of ordinary skill in this art would recognize that certain modifications would come within the scope of the claims. For that reason, the following claims should be studied to determine their true scope and content.

What is claimed is:

1. A fuel cell power plant comprising:
   a cell stack assembly including an anode and a cathode, the cell stack assembly includes an anode and a cathode having a cathode inlet and a cathode outlet, a fluid line connected to one of the cathode inlet or cathode outlet, the fluid line providing a gas pathway, the cell stack assembly configured to have a shut-down procedure in response to a command from a controller;
   a component arranged in fluid connection with the cathode, the component having a first shut-down cooling rate relating to the shut-down procedure based upon component characteristics; and
   a heat exchanger arranged in fluid communication with and between the component and the cathode in the gas passageway configured to carry a gas having water vapor, the gas passageway configured to trap the water vapor in the heat exchanger to minimize condensing of the water vapor in the fuel cell component, the heat exchanger having a second shut-down cooling rate relating to the shut-down procedure greater than the first shut-down cooling rate, the second shut-down cooling rate based upon heat exchanger characteristics, the heat exchanger is arranged adjacent to the component and is configured to condense the water vapor in the heat exchanger instead of the water vapor condensing in the component based upon the differential between the second and first shut-down cooling rates from the heat exchanger and component characteristics.

2. The fuel cell power plant according to claim 1, wherein the heat exchanger includes a heating element, the heating element configured to heat frozen condensed water within the heat exchanger in response to a signal from a controller.

3. The fuel cell power plant according to claim 1, comprising an insulation associated with the component for providing the first shut-down cooling rate, the heat exchanger outside of the insulation.

4. The fuel cell power plant according to claim 3, comprising a fluid line fluidly connecting the component and the heat exchanger, and the insulation arranged around and insulating the fluid line.

5. The fuel cell power plant according to claim 4, wherein the insulation is provided on either side of the heat exchanger.

6. The fuel cell power plant according to claim 4, wherein the insulation is arranged around and insulates the component.

7. The fuel cell power plant according to claim 4, wherein the component includes a movable element arranged within the fluid line and exposed to gas having a condensable water vapor.

8. The fuel cell power plant according to claim 4, comprising fuel and reactant sources respectively in fluid communication with the anode and the cathode, and the heat exchanger arranged between the reactant source and the fuel cell.

9. The fuel cell power plant according to claim 8, wherein the fluid line is an inlet line, and the component is a blower arranged in the inlet line between the reactant source and the cell stack assembly.

10. The fuel cell power plant according to claim 4, wherein the heat exchanger includes a body providing a passageway fluidly connecting the component and the cathode via the fluid line, and fins extending from the body.

11. The fuel cell power plant according to claim 10, comprising a controller, and a heating element arranged in the heat exchanger and in communication with the controller, the controller selectively energizing the heating element in response to frozen water vapor within the heat exchanger.

12. The fuel cell power plant according to claim 10, wherein the body is extends generally linearly between an inlet and an outlet, and the fins are arrange circumferentially about the body and radially inwardly and outwardly therefrom at a central intersection within the body to provide separate the passageway into segments.

13. The fuel cell power plant according to claim 12, wherein a heating element is provided at the central intersection, and comprising a controller in communication with the heating element, the controller selectively energizing the heating element in response to frozen water vapor within the heat exchanger.

14. A method of shutting down a fuel cell power plant, the method comprising the steps of:
   providing a heat exchanger in a gas passageway between a fuel cell component and a cell stack assembly, the gas passageway carrying a gas having water vapor, wherein the cell stack assembly includes an anode and a cathode having a cathode inlet and a cathode outlet, a fluid line connected to one of the cathode inlet or cathode outlet, the fluid line providing the gas pathway;
   shutting down the fuel cell power plant; and
   trapping the water vapor from the gas passageway in the heat exchanger to minimize condensing of the water vapor in the fuel cell component, the trapping step includes cooling the fuel cell component at a first shut-down cooling rate, and cooling the heat exchanger at a second shut-down cooling rate that is greater than the first shut-down cooling rate.

15. The method according to claim 14, comprising insulating the gas passageway to condense the water vapor in the heat exchanger instead of the water vapor condensing in the fuel cell component, with the heat exchanger arranged outside of the insulation.

16. A method of shutting down a fuel cell power plant, the method comprising the steps of:
   providing a heat exchanger in a gas passageway between a fuel cell component and a cell stack assembly, the gas passageway carrying a gas having water vapor, wherein the cell stack assembly includes an anode having an anode inlet and an anode outlet, and a cathode having a cathode inlet and a cathode outlet, a fluid line connected to one of the anode inlet, anode outlet, cathode inlet or cathode outlet, the fluid line providing the gas pathway;
   shutting down the fuel cell power plant; and
   trapping the water vapor from the gas passageway in the heat exchanger to minimize condensing of the water vapor in the fuel cell component, the trapping step includes cooling the fuel cell component at a first shut-down cooling rate, and cooling the heat exchanger at a second shut-down cooling rate that is greater than the first shut-down cooling rate, wherein the trapping step includes freezing the water vapor in the heat exchanger subsequent to the shutting down step; and
   thawing the frozen water vapor upon starting the fuel cell power plant by selectively energizing a heating element in the heat exchanger having the frozen water vapor in response to a signal from a controller.

* * * * *